Figure 1:
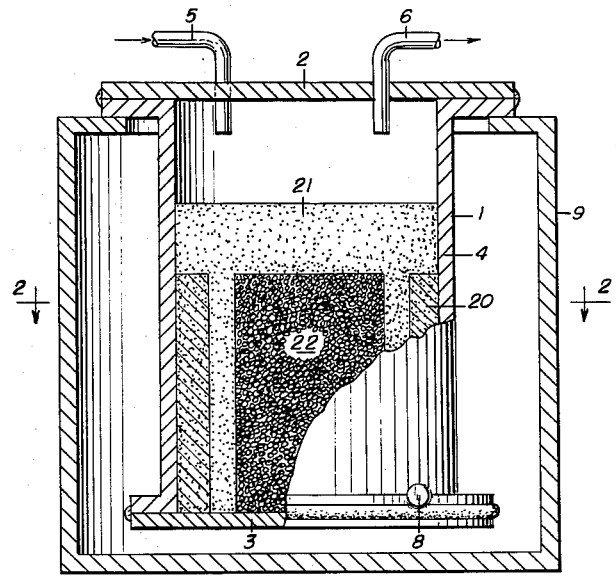

INVENTORS
**MORTON M. WONG
ERNST K. KLEESPIES**

BY *Ernest S Cohen*

ATTORNEYS

United States Patent Office 3,016,296
Patented Jan. 9, 1962

3,016,296
METHOD FOR REDUCTION OF REFRACTORY METAL OXIDE TO METAL BY CALCIUM CARBIDE
Morton M. Wong and Ernst K. Kleespies, Boulder City, Nev., assignors to the United States of America as represented by the Secretary of the Interior
Filed Sept. 23, 1959, Ser. No. 841,904
11 Claims. (Cl. 75—84)
(Granted under Title 35, U.S. Code (1952) sec. 266)

The invention herein described and claimed may be manufactured and used by or for the Government of the United States of America for governmental purposes without the payment of royalties therein or therefor.

This invention relates to the reduction of refractory metal oxides capable of being reduced by calcium, employing calcium carbide and a flux. More particularly, it relates to a method wherein the flux is employed in such a manner as to reduce the contamination of the reduced metal with carbon.

The reduction of refractory metal oxides to the corresponding metal by calcium carbide is known to the art, as illustrated by British Patent 771,139 for example. The reaction occurring, employing titanium oxide as illustrative of the class of refractory metals, may be represented by equations $$TiO_2 + 2CaC_2 \rightarrow Ti + 2CaO + 4C \quad (1)$$
$$Ti + C \rightarrow TiC \quad (2)$$

A high temperature is necessary for the conversion of titanium to metal according to Equation 1. Under the high temperature conditions, carburation according to Equation 2 also occurs, since the carbon is in intimate contact with the metal. In addition, interstitial solution of carbon in titanium may also take place.

In the processes employed heretofore, relatively low temperatures were used in order to minimize carburation of titanium according to Equation 2. However such lower temperature lessened the titanium reduction obtained according to (1). Separation of the elemental carbon from the reaction product was achieved by froth flotation. Any titanium-carbon product present aggravated the separation problem.

It is an object of this invention to provide an improved method for reducing refractory metal oxides to the corresponding metals employing calcium carbide and a flux. It is a further object of this invention to so dispose the flux as to physically separate the refractory metal oxide and the calcium carbide. Yet a further object is to provide a method whereby the carbide dissociates into carbon and calcium under elevated temperatures and the latter dissolves in the flux and reacts with the refractory metal oxide, forming the refractory metal, and whereby the molten flux is then drained off leaving the metal and carbon reaction products spaced apart and easily separated.

A further object of the invention is to provide a process wherein calcium carbide is dissociated by heating into carbon and calcium, in the presence of a flux which dissolves the calcium, and then transferring the calcium dissolved in flux to contact the refractory metal oxide.

Figure 2:
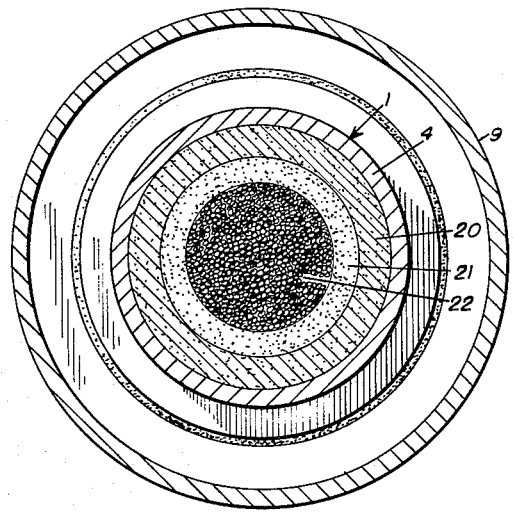

Further objects will be apparent from a consideration of the following specification and claims in connection with the drawing wherein:

FIG. 1 shows a partial vertical section of one form of a structural arrangement including a crucible in a retort, in which the process of the invention may be effectuated; and FIG. 2 is a plan sectional view of the arrangement of FIG. 1, along line 2—2.

Concisely stated, the foregoing objects are accomplished by employing a flux, which when molten dissolves calcium, to physically separate the refractory metal oxide from the calcium carbide. As a result very little, if any, carbon comes into contact with the refractory metal.

In one form found satisfactory, the three components are placed in separate vertical zones in a crucible. When the charge is heated, the flux melts and the calcium carbide dissociates into carbon and calcium according to the equation $CaC_2 \rightarrow Ca + 2C$. Carbon, since it is a solid under the reaction condition, remains in the original $CaC_2$ zone, while the calcium goes into solution in the flux and eventually reaches the refractory metal oxide. Reduction takes place, forming the refractory metal and calcium oxide. Carburation of the refractory metal is substantially eliminated since contact between it and the carbon is prevented.

After the reaction ceases, or is terminated, all of the refractory metal, plus the oxide if any, is in one zone, while all of the carbon plus unreacted calcium carbide, if any, is in another zone. The flux may be tapped off while molten, leaving a void between the two zones so that they may easily be separated. Alternatively, the flux may be allowed to cool in place, without being tapped off. If the proper amount of flux is employed, which may be determined by simple tests, the pores in the packed mass will be filled with molten flux, and on cooling, due to contraction, a void will be formed between the refractory metal oxide and carbon zones. If a large excess of flux is employed, the separation does not occur and the resultant mass contains three zones. However, the boundaries of these are sharply defined by the different colors and the zones may be readily separated.

The amount of flux employed must be sufficient to cover both reactants for best results. If desired, a portion of the flux may be admixed with the refractory oxide before placing the latter in the crucible. It is desirable that the salts employed as fluxes be anhydrous in order to avoid formation of acetylene by contact of moisture with the calcium carbide.

Any of the refractory metal oxides reducible by calcium may be employed. These include the oxides of titanium, zirconium, chromium, etc. Any compound which is capable of dissolving calcium metal, and is inert toward the calcium carbide and the refractory metal and its oxide, may be employed as the flux. Included are the halides of the alkali metals, the halides of the alkaline earth metals, borates, simple or compound fluorides, and boric anhydride, e.g. $KCl$, $CaCl_2$, $KF$, $B_2O_3$, etc. Mixtures of these compounds may be employed as well.

A conventional crucible constructed of unreactive materials, and formed very similar to the structure shown in FIG. 1 of the aforesaid British Patent 771,139, provides a suitable means wherein the reaction is conducted under an atmosphere of helium or other inert gas. As illustrated in the figures of the drawing herein, crucible 1 is sealed at its top and bottom by plates 2 and 3, fastened by welding for example, to end flanges on a cylindrical body portion 4. Conduits 5 and 6, inserted through gas tight fittings in the top plate 2, provide inlet and outlet passages for the inert gas which fills the crucible 1 containing the reactants. A plugged tape hole 8 through the wall at the lowest part of the body portion 4, provides a drain for the flux after the process has been carried to completion. Heating facilities for the crucible may be any conventional form of heater or furnace enclosure, such as the retort 9 shown in the drawing wherein the crucible is supported on the rim of the retort opening, by means of its enlarged upper closure 2. The reactants shown in in the drawing as consisting of an oxide 20, a flux 21, and a carbide 22, are arranged as more particularly shown in FIG. 2, in distinct contacting layers concentric about the vertical axis of the crucible. With reference to FIG. 1, it is seen that the flux 21 also forms a layer to cover over the top surfaces of the oxide and carbide layers 20, and 22.

The reaction temperature should be sufficient to decompose the calcium carbide into its component elements, high enough to melt the flux, but insufficient to melt the refractory metal. Although any temperature meeting these conditions may be employed, a range of 900°–1000° C. was found to be satisfactory. Higher temperatures, which increase the rate of reduction are likewise contemplated.

The reaction is continued until the desired degree of conversion is effected. A six-hour reaction time was found to give satisfactory results.

Stoichiometric amounts of the reactants may be employed. However, an excess of calcium carbide was found to be desirable, such as an excess of one to two moles over that called for by the equation. The quantity of flux employed is around twice the weight of calcium carbide used. This is not critical, and may be varied substantially. It is important however, that the amount be sufficient so as to cover both reactants when the flux is molten.

The following examples are specific embodiments of the invention:

Example 1

The crucible employed in this reduction was of black iron and 3¾ inches in diameter. 300 grams of commercial grade $CaC_2$ was placed in the center of the crucible in the form of a column 2½ inches in diameter and 4 inches high. 100 grams of pigment grade $TiO_2$ was placed along the crucible's inner periphery to a thickness of 3/16 of an inch and 4 inches high. 600 grams of anhydrous $CaCl_2$ of C.P. grade was placed in the annular space between the reactants, forming a mass 5¾ inches high.

The crucible and its contents was placed in a stainless steel retort and heated at a temperature of 900–1000° C. for 6 hours under a helium atmosphere. The crucible was then allowed to cool, and the $TiO_2$ zone was found to be completely separated from the CaO zone by an annular void. Only 1.22% Ti was found in the $CaC_2$ zone, the remainder being C, $CaC_2$ and $CaCl_2$. In the $TiO_2$ zone, only 1.36% C was present, and a good conversion to titanium metal was noted.

Example 2

This experiment was conducted under the same conditions as example 1 with the exception that 100 grams of KF was mixed with the $TiO_2$ and instead of 600 grams of $CaCl_2$, only 500 grams was used. At the end of the run, the $CaC_2$ zone showed only 0.22% Ti, and the $TiO_2$ zone showed only 2.21% C while a good conversion to titanium metal was noted.

While the examples show the reactants and flux arranged in vertical zones, other dispositions of the components which achieve the same results of preventing carburation of metal and the separating of carbon from metal, are possible. Another method which may be employed is to provide two separate reaction vessels, with the $CaC_2$ and flux in one and the $TiO_2$ in the other. On heating the $CaC_2$ vessel the calcium formed dissolves in the flux, and the solution, free from carbon, is contacted with the $TiO_2$.

It is apparent that many changes and modifications may be made in the details of the invention without departure from its essential spirit.

We claim:

1. In the method for the preparation of refractory metals by reduction of an oxide of said refractory metal with calcium carbide in the presence of a flux material at a temperature at which the flux material is molten, the improvement which comprises disposing said carbide and flux and a reactant comprising refractory metal oxide in generally vertical layers within a crucible, the individual layers of the said oxide reactant and carbide being separated by each being in intimate contact with at least a different one of the walls of flux, which define the distinct generally vertically disposed outer surfaces of the layer of flux.

2. In the method for the preparation of refractory metals by reduction of an oxide of said refractory metal with calcium carbide in the presence of a flux material at a temperature at which the flux material is molten, the improvement which comprises disposing said carbide and flux and a reactant comprising refractory metal oxide in layers within a crucible, the layers of said oxide reactant and carbide being separated by a layer of flux, the layers being disposed concentrically about the vertical axis of the crucible.

3. In the method for the preparation of refractory metals by reduction of an oxide of said refractory metal with calcium carbide in the presence of a flux material at a temperature at which the flux material is molten, the improvement which comprises disposing said carbide in a generally cylindrical mass substantially along the vertical axis of the crucible, disposing a reactant comprising refractory metal oxide in an annular layer spaced from and surrounding the carbide, said carbide mass and annular oxide layer having upper surfaces, the space between the carbide and oxide being filled by a quantity of flux material sufficient to cover the said upper surfaces.

4. In the method for the preparation of refractory metals by reduction of an oxide of said refractory metal with calcium carbide in the presence of a flux material at a temperature at which the flux material is molten, the improvement which comprises disposing said carbide in a generally cylindrical mass substantially along the vertical axis of the crucible, disposing a reactant comprising refractory metal oxide in an annular layer spaced from and surrounding the carbide, said carbide mass and annular oxide layer having upper surfaces, the space between the carbide and oxide being filled by a quantity of flux material sufficient to cover the said upper surfaces, withdrawing molten flux from the crucible after the reduction and then separating refractory metal from the rest of the reduction products.

5. In the method for the preparation of refractory metals by reduction of an oxide of said refractory metal with calcium carbide in the presence of a flux material at a temperature at which the flux material is molten, the improvement which comprises disposing said carbide in a generally cylindrical mass substantially along the vertical axis of the crucible, disposing a reactant comprising refractory metal oxide in an annular layer spaced from and surrounding the carbide, said carbide mass and annular oxide layer having upper surfaces, the space between the carbide and oxide being filled by a quantity of flux material sufficient to cover the said upper surfaces, permitting the molten flux to cool and solidify after the reduction, and then separating refractory metal from the rest of the reduction products.

6. The improvement as in claim 3, wherein the refractory metal oxide is a member of the class consisting of titanium, zirconium, and chromium oxides and the flux is a member of the class consisting of alkali metal and alkaline earth metal halides and mixtures thereof.

7. The improvement as in claim 3, wherein the reactant comprising a refractory metal oxide consists of a mixture of a major amount of a refractory metal oxide and a minor amount of a member of the class consisting of alkali metal halide and alkaline earth metal halide, and the flux is a member of the class consisting of alkali metal halides and alkaline earth metal halides and mixtures thereof.

8. The improvement as in claim 3, wherein the refractory metal oxide reactant consists of titanium oxide and the flux consists of calcium chloride.

9. The improvement as in claim 7, wherein the reactant comprising a refractory metal oxide consists of a mixture of titanium oxide and potassium fluoride and the flux consists of calcium chloride.

10. The improvement as in claim 8, wherein the molten flux is withdrawn from the crucible after reduction and the reduced metal is then separated from the rest of the reaction products.

11. The improvement as in claim 8, wherein the molten flux is allowed to cool and solidify after the reduction, and the reduced metal is then separated from the rest of the reduction products.

References Cited in the file of this patent

FOREIGN PATENTS 771,139    Great Britain ---------- Mar. 27, 1957